(12) United States Patent
Shaw et al.

(10) Patent No.: US 6,595,574 B2
(45) Date of Patent: Jul. 22, 2003

(54) REMOVABLE VEHICLE ROOF

(75) Inventors: Jay Shaw, Fenton, MI (US); Peter Nétzel, Hamburg (DE); Thorsten Schumacher, Kummerfeld (DE)

(73) Assignee: CTS Fahrzeug- Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/237,570

(22) Filed: Sep. 9, 2002

(65) Prior Publication Data

US 2003/0052511 A1 Mar. 20, 2003

(30) Foreign Application Priority Data

Sep. 10, 2001 (DE) .......................... 101 44 515

(51) Int. Cl.⁷ ................................. B60J 7/14
(52) U.S. Cl. ................. 296/120.1; 296/108; 296/121; 296/122; 296/124; 296/128
(58) Field of Search .............. 296/108, 120.1, 296/121, 122, 124, 128

(56) References Cited

U.S. PATENT DOCUMENTS 5,026,110 A * 6/1991 Koop et al. ............... 296/108
5,052,740 A * 10/1991 Bauer et al. ............. 296/120.1
5,944,375 A * 8/1999 Schenk et al. ............. 296/108
6,033,008 A * 3/2000 Mattila ....................... 296/124
6,267,433 B1 * 7/2001 Bayer et al. ................ 296/121

FOREIGN PATENT DOCUMENTS

DE       196 34 511      1/1996
DE       195 07 431      8/1996

* cited by examiner

Primary Examiner—Dennis H. Pedder
(74) Attorney, Agent, or Firm—Klaus J. Bach

(57) ABSTRACT

In a removable vehicle roof including an operating mechanism for moving the roof between a closed position in which the vehicle roof covers an interior vehicle space and a storage position in which the vehicle roof is deposited in a rear storage compartment, the operating mechanism includes operating and coupling arms which are pivotable relative to each other and provided with locking means for locking the vehicle roof in position in the storage compartment and also for rigidly interconnecting the operating and coupling arms when the vehicle roof is in a closed position.

8 Claims, 3 Drawing Sheets

REMOVABLE VEHICLE ROOF

BACKGROUND OF THE INVENTION

The invention relates to a removable vehicle roof, which includes an operating mechanism such that the vehicle roof is movable between a closed position and a storage position in which the vehicle roof is lowered into a rear roof storage compartment.

A two-section movable hardtop vehicle roof is disclosed for example in DE 196 35 869 C1. The hardtop comprises a front and a rear roof shell, which can be lowered into a rear storage compartment when the roof is opened. The storage compartment can be closed by a storage compartment lid which, during the transfer of the roof between the closed and opened positions, is pivoted open in order to provide an opening through which the roof is moved into, or out of, the storage compartment.

In order to retain the vehicle roof in the storage compartment, a engagement mechanism is provided which includes a centering pin which is disposed at the front roof section and which, during lowering of the roof, extends into a respective cavity in the opened storage compartment lid in a form-fitting manner. The storage compartment lid and the vehicle roof are then lowered together in a synchronous motion and the lid is closed. Because of the form-fitting engagement between the centering pin of the vehicle roof and the storage compartment lid, the roof is immovably retained in the storage compartment when it is deposited therein.

Generally, with convertible vehicles, there is the problem that, with the roof closed, the roof sections tend to be raised at higher vehicle speeds because a low pressure area is formed at the outer surface of the roof. The raising of the roof sections may detrimentally affect the sealing properties of the roof and may cause damage to the roof because of the high forces effective thereon over long periods.

It is the object of the present invention to provide a removable vehicle roof, which can be safely locked in its closed and also in its storage position with relatively low expenses.

SUMMARY OF THE INVENTION

In a removable vehicle roof including an operating mechanism for moving the roof between a closed position, in which the vehicle roof covers an interior vehicle space, and a storage position, in which the vehicle roof is deposited in a rear storage compartment, the operating mechanism includes operating and coupling arms which are pivotable relative to each other and provided with locking means for locking the vehicle roof in position in the storage compartment and also for rigidly interconnecting the operating and coupling arms when the vehicle roof is in a closed position.

The vehicle roof includes an locking structure at a linkage part of the roof operating mechanism, which locks the respective linkage part in the storage position of the roof and also in the closed position thereof with respect to the vehicle body or with respect to other linkage parts. In this way, it is possible to arrest the roof in both end positions of the roof with only a single locking structure, whereby the design is simplified and the construction expenses are reduced. At the same time, maximum safety against undesired movements of the roof in the open and closed positions of the roof is obtained. In the closed position, the rigid connection which is established by the locking structure provides for rigidity between the linkages involved so that, particularly in the center area of the roof which, in the closed position of the roof, is subjected to particularly high lifting forces and in which generally the pivot joints are disposed, the rigidity of the roof is substantially improved. As a result, the chances that the roof is raised by the low pressure above the roof are substantially reduced.

The locking of the vehicle roof in the closed position and in the storage position is achieved expediently by way of a locking member, which is arranged at one of the linkage parts of the roof operating mechanism. This locking member has particularly the form of a locking hook, which is pivotally supported on the linkage part and which, in its locking position, engages a locking pin mounted to the vehicle body when the vehicle roof is in the storage position and which engages a locking pin mounted on another linkage part when the vehicle roof is in a closed position.

The two linkage parts may be joined by a common joint. In that case, the locking member is expediently supported on the first linkage part at a distance from this joint and, in the closed position of the vehicle roof, engages the second linkage part also at a distance from that joint. In this embodiment, the engagement points of the locking member with the linkage parts and the joint between the linkage parts define a triangle wherein the locking member forms one side of the triangle which prevents any pivot movement about the joint.

The locking member is expediently biased into its locking position which bias can be utilized for the locking of the roof when the roof is in the storage position and when it is in the closed position. For the movement of the roof out of the respective end position, it is only necessary to move the locking member out of its locking position, which can be done manually or, in accordance with a preferred embodiment, by way of an automatic operating mechanism.

In an advantageous embodiment, the locking mechanism includes a engagement mechanism by way of which the vehicle roof can be connected to a windshield frame.

The coupling is so designed that the lock is released when the engagement mechanism is disengaged. Since for opening the roof and depositing it in the storage compartment, the engagement mechanism must be released anyhow so that the front roof section can be disengaged from the windshield frame, this opening movement can be transferred by way of a suitable transfer member to the locking mechanism which at the same time is unlocked that is moved to a release position. The locking mechanism can be operated for a release also when the roof is in the storage compartment so that no additional operating mechanism is needed for releasing the locking mechanism when the roof is in the storage compartment. The transfer member between the retaining structure and the locking mechanism is preferably an operating cable. The locking of the retaining structure occurs preferably under the influence of a spring element engaging the locking member.

The invention will become more readily apparent from the following detailed description thereof on the basis of the accompanying drawings.

DESCRIPTION OF A PREFERRED EMBODIMENT

Figure 1:
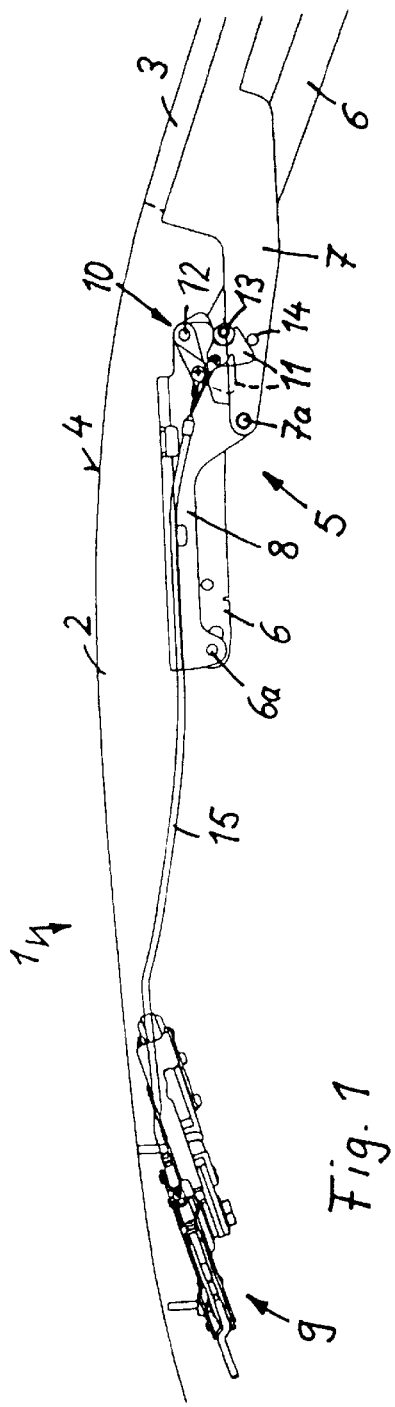
FIG. 1 shows a vehicle roof in a closed position wherein tow linkage parts, which are part of the roof operating mechanism, can be locked in position with respect to each other by a retaining mechanism.

In the figures, identical components are indicated by the same reference numerals.

Figure 2:
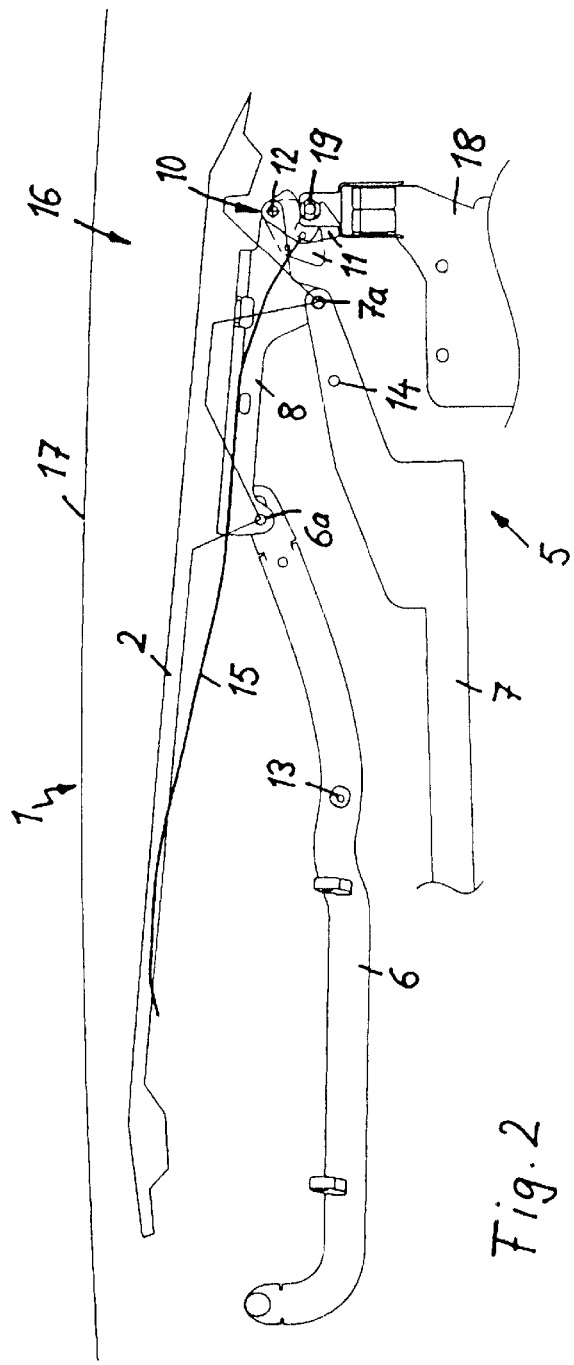
FIG. 2 shows the vehicle roof in the storage position wherein one of the linkage parts is locked by the retaining mechanism to the vehicle body.

FIG. 1 shows a removable vehicle roof 1, for example, a hardtop with a front roof section 2 and a rear roof section 3 in the form of rigid roof shells, which are shown in FIG. 1 in a closed position, in which they cover the interior of a vehicle and form a continuous outer roof surface 4. The vehicle roof 1 is movable by a roof operating mechanism 5 including a plurality of individual relatively movable links between a closed position, in which the vehicle passenger compartment is closed as shown in FIG. 1 and a storage position as shown in FIG. 2, wherein the vehicle roof is deposited in a rear storage compartment.

The roof operating mechanism 5 comprises a first main operating arm 6 and a second main operating arm 7, which are each pivotally supported on the vehicle body and which are pivotally connected, at their opposite ends at the roof, by way of joints 6a, and 7a to a coupling arm 8. The main operating arms 6 and 7 and the coupling arm 8 disposed therebetween form a four-joint operating mechanism. The front roof part 2 is firmly connected to the coupling arm 8.

In the closed position of the roof 1, the front roof part 2 is locked to the windshield frame by way of the engagement mechanism 9.

Furthermore, an engagement device 10 is provided which is part of the roof operating mechanism 5 and which comprises a locking mechanism in the form of a locking hook 11, which is pivotally supported on the coupling arm 8 by way of a pivot joint 12. The locking hook 11 is pivotable about the pivot joint 12 on the coupling arm 8 between an engagement position shown in FIG. 3 by a solid line and a release position shown by a dashed line. In the engagement position, the locking hook 11 engages a locking pin 13, which is firmly mounted on the first main operating arm 6 such that a rigid connection is established between the coupling arm 8 and the first main operating arm 6 whereby any relative pivot movement between these linkage parts is prevented. As a result, also any other relative movement within the four-joint operating mechanism is prevented The locking pin 13 may be in the form of a rotatable eccenter. It is furthermore expedient to provide a stop 14 on the second main operating arm 7, which limits the engagement movement of the locking hook 11.

Between the engagement mechanism 9 for the locking of the vehicle roof to the windshield frame and the locking mechanism 10 for the arresting of the main operating arms 6 and 7, there is provided a motion transfer member, preferably in the form of an operating cable 15, which transfers a release movement of the engagement mechanism 9 to a release movement of the locking mechanism 10. As soon as the engagement mechanism 9 is released in order to unlock the vehicle roof 1 from the windshield frame and to permit its transfer into the storage position, also the locking mechanism 10 is placed into a release position and the locking hook 11 is pivoted out of its engagement position which is shown in full lines so that the four-joint operating mechanism consisting of the two main operating arms 6 and 7 and the coupling arm 8 are unlocked and can perform a pivot movement.

Figure 3:
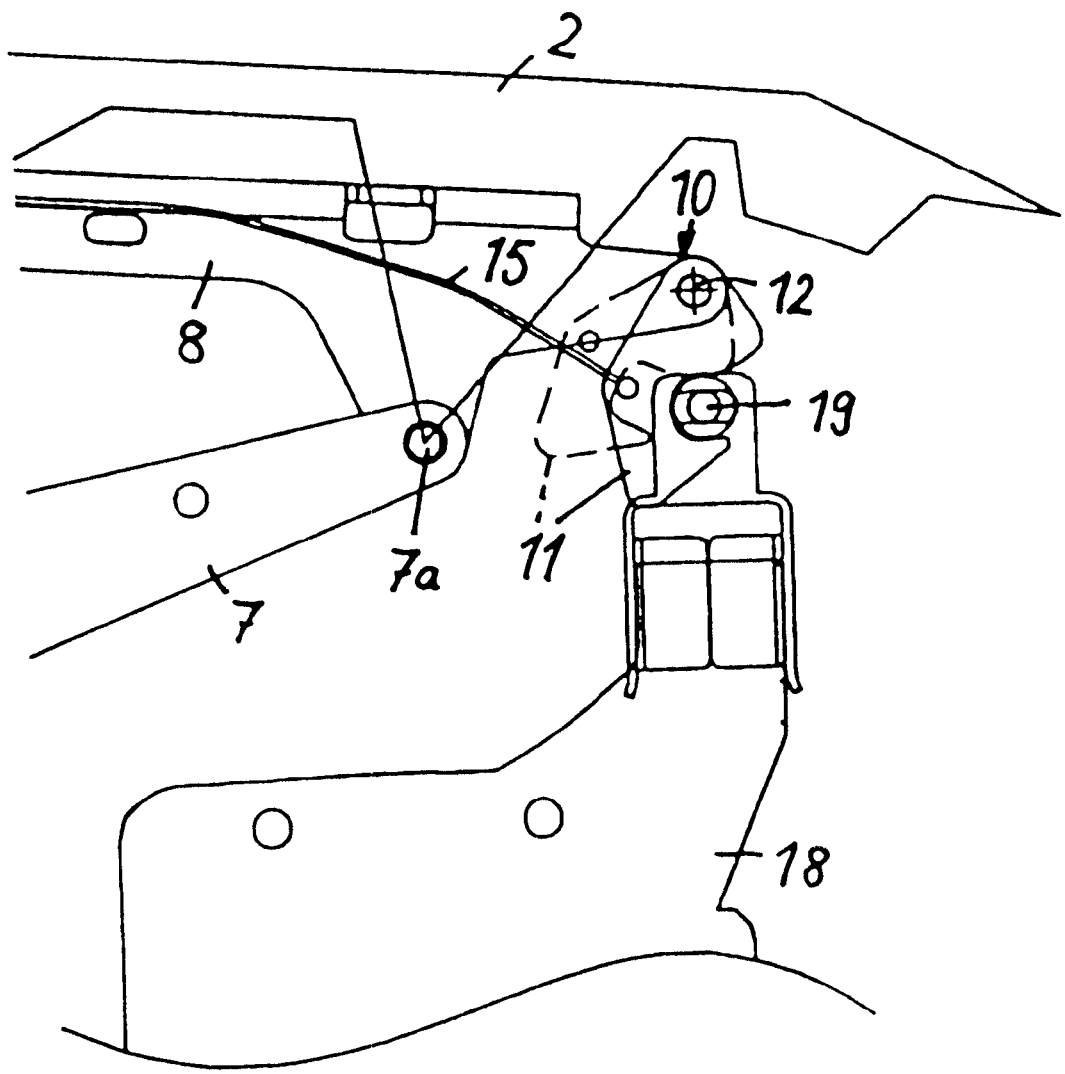
FIG. 3 is an enlarged view of a section of FIG. 2 showing the area of the retaining mechanism.

In FIGS. 2 and 3, the storage position of the vehicle roof 1 is shown wherein the vehicle roof is deposited in a rear storage compartment 16, which can be closed by a storage compartment lid 17. In the storage position of the roof, the coupling arm 8 is engaged by way of the locking hook 11 of the engagement device 10 with a locking pin 19, which is firmly connected to a body-mounted support block 18. The locking pin 19 may be adjustably mounted on the support block 18 for the adjustment of the engagement position. In the engagement position, the locking hook 11 extends around the locking pin 19 whereby any movement of the four joint operating mechanism is prevented and the vehicle roof 1 is safely held in position within the storage compartment 16.

The locking hook 11 is moved by the operating cable 15 from its locking position to the release position of the vehicle roof 1. The operating cable is expediently actuated also in the storage position of the roof by the engagement mechanism 9.

Figure 4:
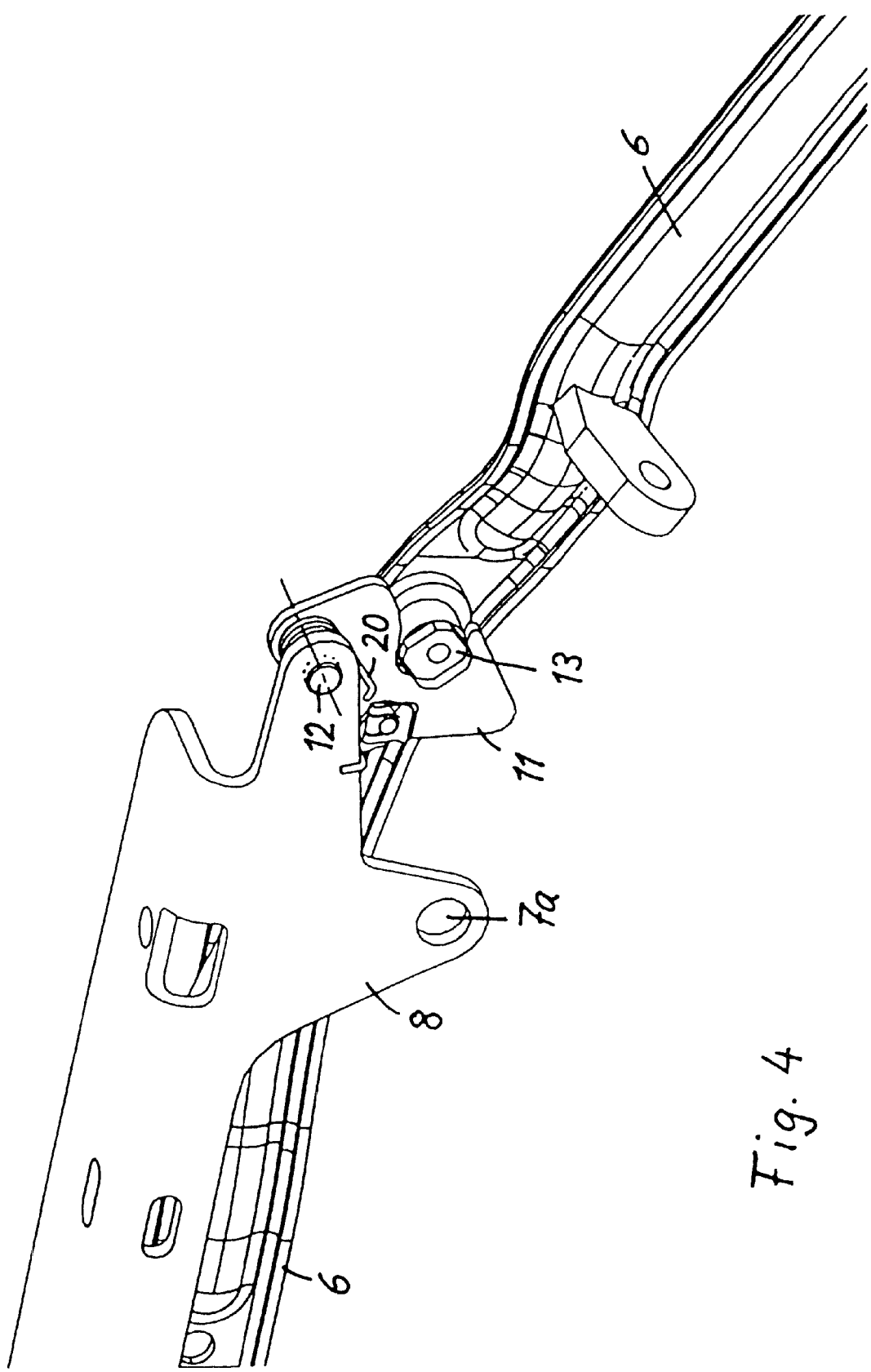
FIG. 4 is a perspective view of the connecting area of two linkages of the roof operating mechanism showing the retaining structure.

As shown in FIG. 4, in which the first main operating arm 6 and the coupling arm 8 are shown in the closed position of the vehicle roof and wherein, for clarity reasons, the second main operating arm 7 is omitted, a torsional spring 20 engages the locking hook 11 and biases the locking hook about its pivot joint 12 into the locking position. In the closed position of the vehicle roof, the locking hook 11 is therefore pivoted to a position in which it engages the locking pin 13 mounted to the first main operating arm 6. From this position, the locking pin 11 can be transferred, by actuation of the operating cable, to the release position in which the locking pin 13 is again released. The same applies to the storage position of the roof in the roof storage compartment wherein the locking hook is also biased by the torsional spring 20 toward its locking position.

What is claimed is:

1. A removable vehicle roof comprising an operating mechanism for moving the roof between a closed position, in which the roof covers an interior vehicle space, and a storage position, in which the vehicle roof is deposited in a rear vehicle storage compartment, said operating mechanism including first and second main operating arms for pivotal connection at one end to a body portion of said vehicle and at their free end to a coupling arm, a locking member mounted to said coupling arm for engaging a retaining member in the storage position of said vehicle roof in said storage compartment, and a locking structure on said first main operating arm arranged so as to be engaged by said locking member when said vehicle roof is in the closed position to thereby rigidly interconnect said coupling and operating arms of said operating mechanism to prevent any movement therebetween.

2. A removable vehicle roof according to claim 1, wherein said locking member is a locking hook pivotally mounted to said coupling arm and said locking structure on said first main operating arm is a pin which is engaged by said locking hook.

3. A removable vehicle roof according to claim 1, wherein said coupling arm and said first main operating arm are interconnected by a joint and said locking structure is mounted to said first main operating arm at a distance from said joint.

4. A removable vehicle roof according to claim 1, wherein said locking member is spring-biased into a locking position.

5. A removable vehicle roof according to claim 4, wherein said locking member is spring-biased into its locking position by a torsional spring.

6. A removable vehicle roof according to claim 1, wherein said vehicle roof includes an engagement mechanism for locking the vehicle roof to a vehicle window frame when said vehicle roof is in its closed position and means are provided for moving said locking member to a release position when said engagement mechanism is actuated to release said vehicle roof from said window frame.

7. A removable vehicle roof according to claim 6, wherein said means for moving said locking member to a release position is an operating cable extending between said engagement mechanism and said locking member for transferring actuation of said engagement mechanism for releasing the vehicle roof to said locking member to move it also to a release position.

8. A removable vehicle roof according to claim 1, wherein said coupling arm and said main operating arms are part of a four-joint operating mechanism by way of which the vehicle roof is coupled to a vehicle body.

* * * * *